US009013486B2

(12) United States Patent
Zafar et al.

(10) Patent No.: US 9,013,486 B2
(45) Date of Patent: Apr. 21, 2015

(54) METHODS AND SYSTEMS OF GRAPHICALLY CONVEYING A STRENGTH OF COMMUNICATION BETWEEN USERS

(71) Applicant: Verizon Patent and Licensing Inc., Arlington, VA (US)

(72) Inventors: Shadman Zafar, Coppell, TX (US); Brian F. Roberts, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 13/970,139

(22) Filed: Aug. 19, 2013

(65) Prior Publication Data

US 2013/0337768 A1    Dec. 19, 2013

Related U.S. Application Data

(63) Continuation of application No. 12/242,840, filed on Sep. 30, 2008, now Pat. No. 8,514,226.

(51) Int. Cl.
| | |
|---|---|
| G06T 11/20 | (2006.01) |
| H04W 24/00 | (2009.01) |
| G06K 9/00 | (2006.01) |
| H04L 12/26 | (2006.01) |
| G06Q 10/10 | (2012.01) |
| G06T 11/40 | (2006.01) |

(52) U.S. Cl.
CPC .............. *H04W 24/00* (2013.01); *G06Q 10/10* (2013.01); *H04L 43/065* (2013.01); *G06T 11/203* (2013.01); *G06T 11/206* (2013.01); *G06T 11/40* (2013.01)

(58) Field of Classification Search
CPC ...... G06T 11/206; G06Q 10/10; H04W 24/00
USPC ............................ 345/440; 705/319; 709/224
See application file for complete search history.

(56) References Cited

U.S. PATENT DOCUMENTS

| | | | | |
|---|---|---|---|---|
| 2008/0104225 | A1* | 5/2008 | Zhang et al. | 709/224 |
| 2010/0145771 | A1* | 6/2010 | Fligler et al. | 705/10 |

* cited by examiner

*Primary Examiner* — Jin-Cheng Wang

(57) ABSTRACT

An exemplary method includes at least one physical computing device 1) determining a first strength of communication metric representative of a strength of communications initiated by a first user towards a second user during a time period and a second strength of communication metric representative of a strength of communications initiated by the second user towards the first user during the time period, 2) generating a strength of communication graphic that graphically represents the strength of the communications initiated by the first user towards the second user relative to the strength of the communications initiated by the second user towards first user, and 3) providing the graphic for display by an access device associated with the first user. Corresponding methods and systems are also disclosed.

20 Claims, 15 Drawing Sheets

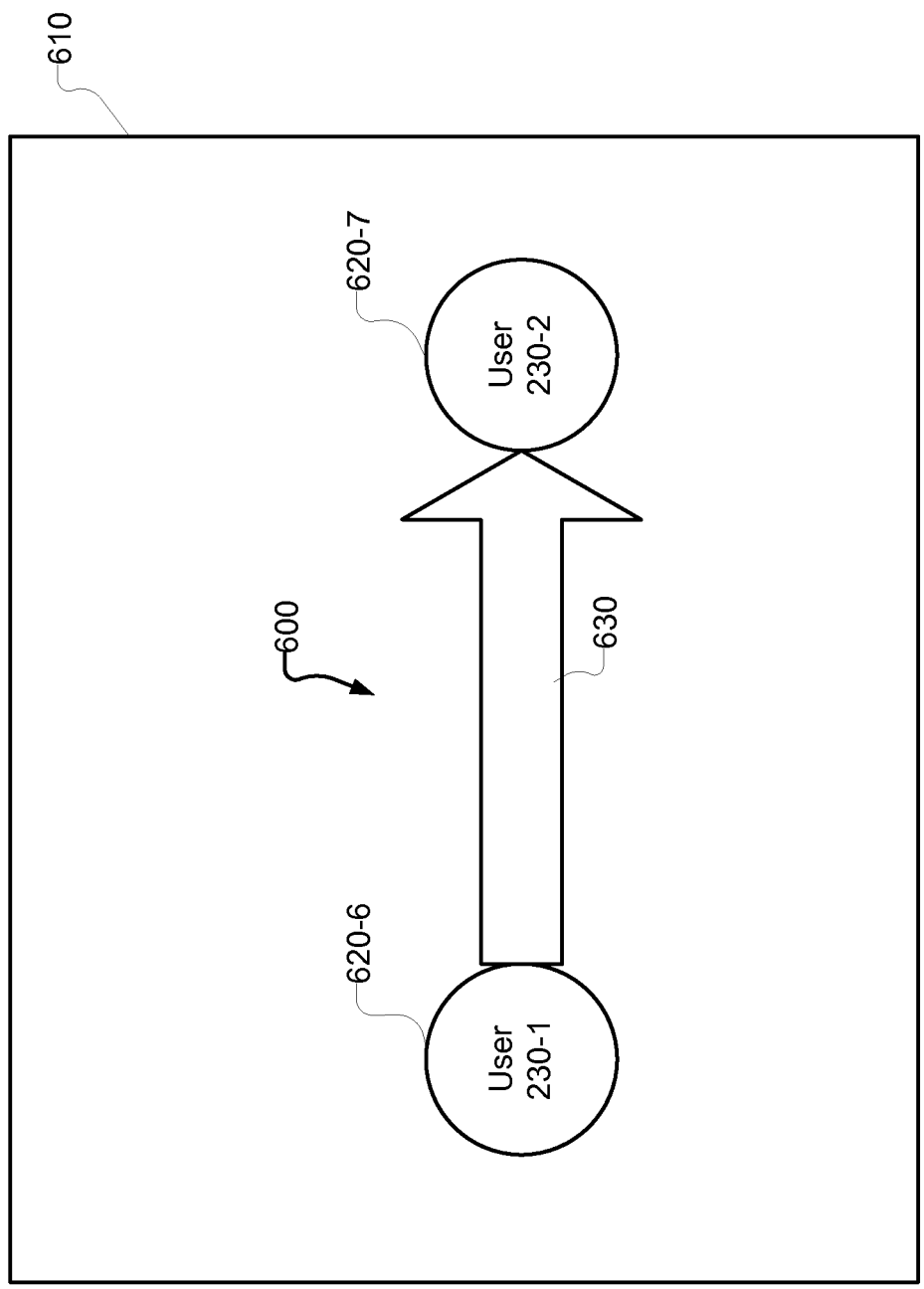

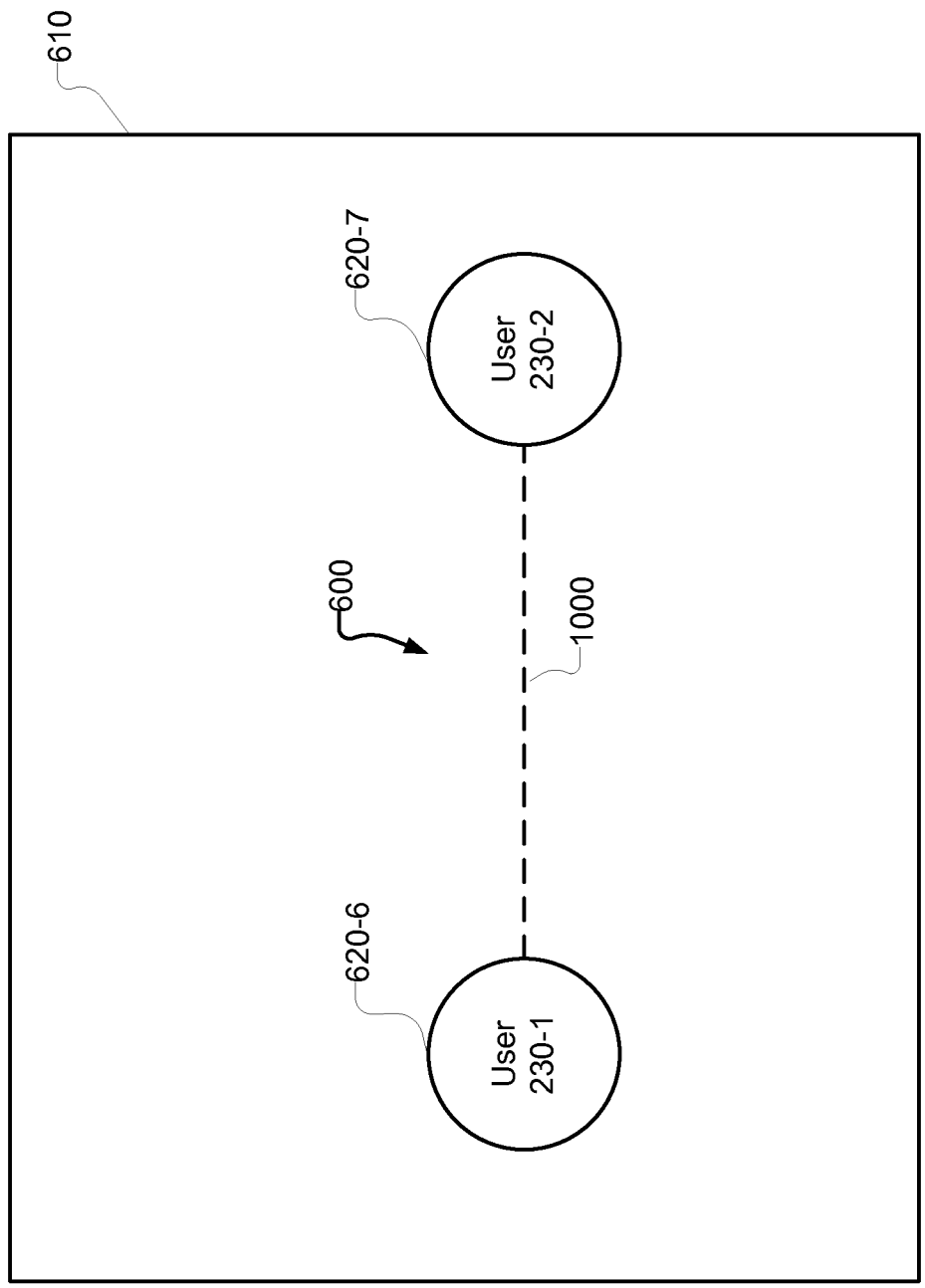

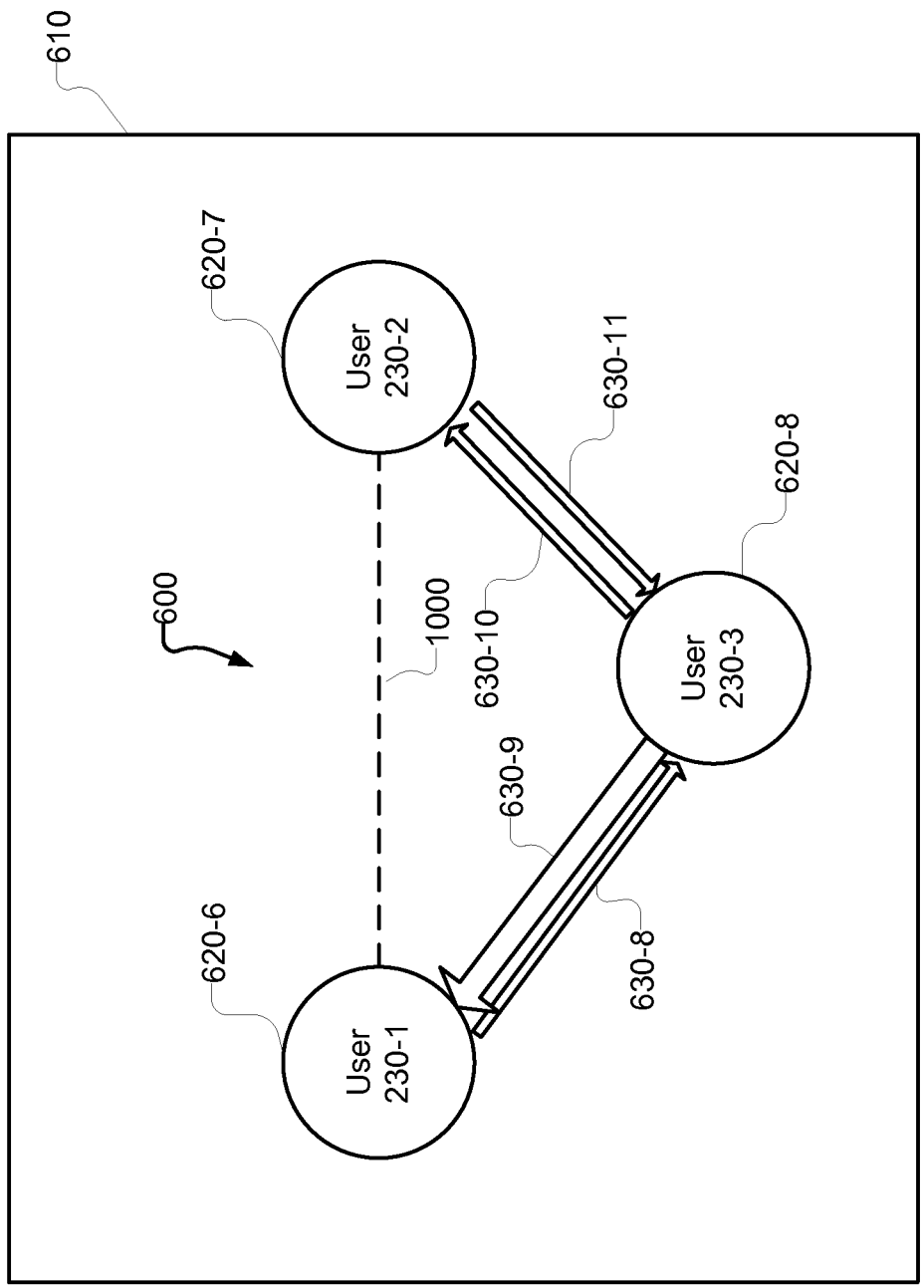

US 9,013,486 B2

METHODS AND SYSTEMS OF GRAPHICALLY CONVEYING A STRENGTH OF COMMUNICATION BETWEEN USERS

RELATED APPLICATIONS

The present application is a continuation application of U.S. patent application Ser. No. 12/242,840, filed on Sep. 30, 2008, and entitled "METHODS AND SYSTEMS OF GRAPHICALLY CONVEYING A STRENGTH OF COMMUNICATION BETWEEN USERS," which is hereby incorporated by reference in its entirety.

BACKGROUND INFORMATION

Advances in electronic communications technologies have interconnected people and allowed for distribution of information perhaps better than ever before. To illustrate, social networking applications, which allow people to virtually connect with one another, have become enormously popular. Other electronic communication mediums, including email, telephone, instant messaging, and text messaging have also proliferated.

It is often difficult for a user of such communication mediums to track the quantity, frequency, and/or relative quality of communications between the user and friends, acquaintances, and/or other users connected to the user in some way. Hence, a user may not realize that he or she is overly initiating communications with one or more other users, failing to adequately communicate with one or more users, and/or disproportionally using a particular communication medium to the exclusion of others.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9A shows another exemplary strength of communication graphic according to principles described herein.

FIGS. 10A-10C illustrate a configuration wherein a strength of communication graphic may be configured to convey to a first user that a second user unknown to the first user has attempted to communicate with the first user according to principles described herein.

DETAILED DESCRIPTION OF PREFERRED EMBODIMENTS

Methods and systems of graphically conveying a strength of communication between users are described herein. As used herein, "strength of communication" refers to a metric representing any combination of an amount, frequency, type, relative quality, source, and/or duration of one or more communications between a user and one or more other users.

An exemplary method includes generating a graphic configured to represent a strength of communication between a user and another user and modifying the graphic based on at least one factor associated with one or more communications between the users. The at least one factor associated with one or more communications between the users may include, but is not limited to, an amount, a frequency, a type, a relative quality, a source, and/or a duration of one or more communications between the users.

An exemplary system includes a storage facility configured to maintain data associated with a strength of communication between a user and another user and a strength of communication facility configured to generate a graphic configured to graphically represent the strength of communication in accordance with the data. The strength of communication facility is further configured to modify the graphic based on a change in at least one factor associated with one or more communications between the users.

An exemplary apparatus includes a processing facility configured to generate a graphic configured to represent a strength of communication between a user and another user and a display communicatively coupled to the processing facility and configured to display the graphic. The processing facility is further configured to modify the graphic based on at least one factor associated with one or more communications between the user and the other user.

The methods, systems, and apparatuses described herein may allow a user to view how the user interacts with one or more people within his or her social network, contacts list, or other grouping of users. The user may utilize the information conveyed by the strength of communication graphic to modify the way in which the user communicates with others, identify irregular communication trends or patterns, and/or learn more about his or her communication habits and/or the communication habits of one or more other users.

Figure 1:
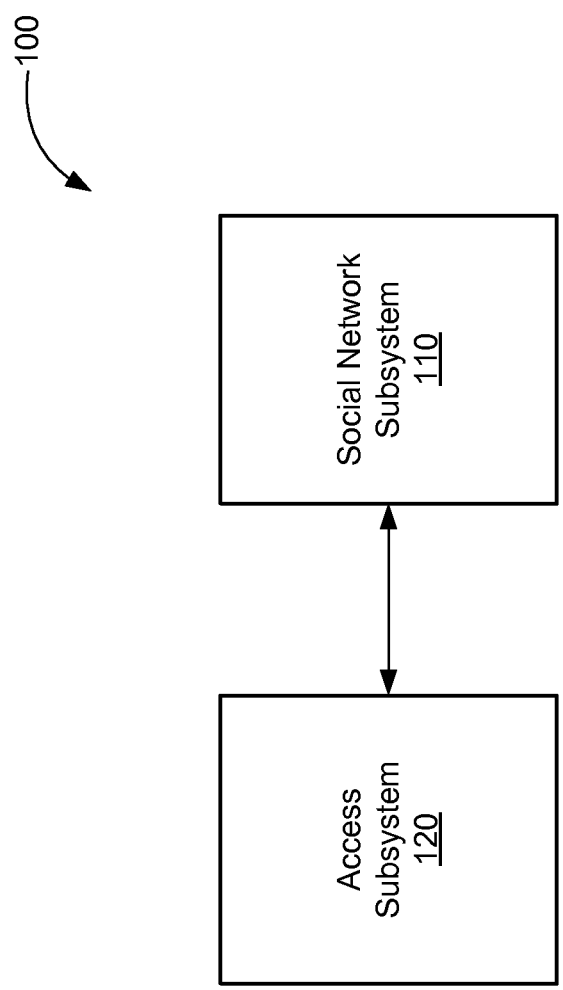
FIG. 1 illustrates an exemplary social networking system according to principles described herein.

FIG. 1 illustrates an exemplary social networking system 100 (or simply "system 100"). As shown in FIG. 1, system 100 may include a social network subsystem 110 and an access subsystem 120 configured to communicate with one another.

Access subsystem 120 and social network subsystem 110 may communicate using any communication platforms and technologies suitable for transporting data representative of content, content metadata, content management commands, and/or other communications, including known communication technologies, devices, media, and protocols supportive of remote or local data communications. Example of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
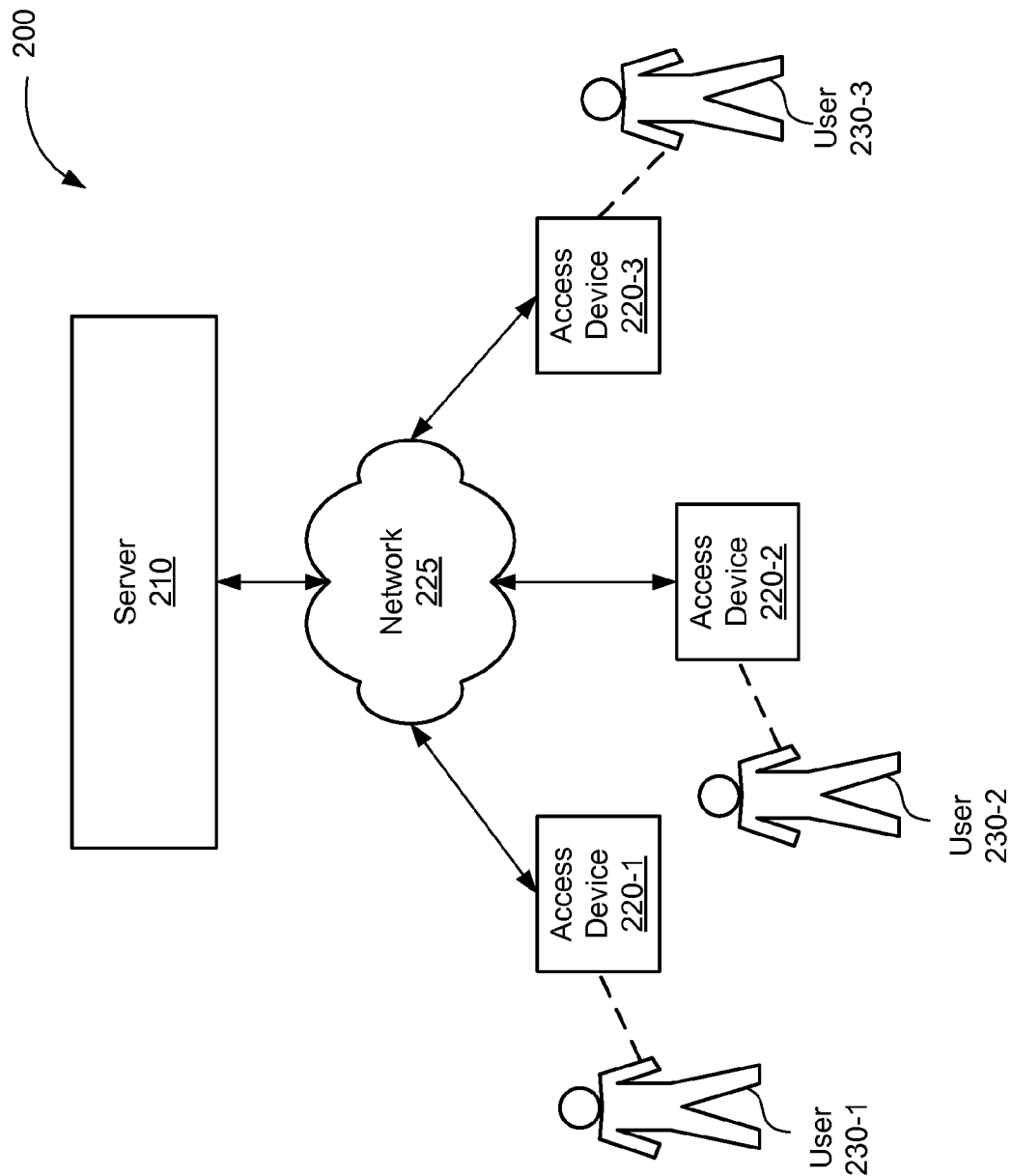
FIG. 2 shows an exemplary implementation of the system of FIG. 1 according to principles described herein.

FIG. 2 shows an exemplary implementation 200 of system 100. In implementation 200, social network subsystem 110 may include or be implemented within at least one server 210, and access subsystem 120 may include or be implemented within at least one access device (e.g., access devices 220-1 through 220-3, collectively referred to herein as "access devices 220") configured to communicate with server 210 by way of a network 225. Network 225 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "(VoIP") networks, Public Switched Telephone Networks ("PSTN"), and any other networks capable of carrying data representative of content, data associated with content (e.g., metadata), data management commands, and/or communications signals between access devices 220 and server 210. Communications between server 210 and access devices 220 may be transported using any one of above-listed networks, or any combination or sub-combination of the above-listed networks.

Each access device 220 may include any device configured to perform one or more of the processes described herein, including communicating with and/or transmitting and receiving content, data associated with content (e.g., metadata), social networking commands, and/or content operation commands to/from social network subsystem 110 and/or other access devices 220 by way of network 225. Access device 120 may include, but is not limited to, a computing device (e.g., a desktop or laptop computer), a set-top box, a communication device, a wireless computing device, a wireless communication device (e.g., a mobile phone), a Global Positioning System ("GPS") device, a personal digital assistant, a content recording device (e.g., a camera, audio recorder, video camera), a vehicular computing and/or communication device, a content-enabled device, a gaming device, and/or any other device configured to acquire, transmit, receive, access, or otherwise process content.

As shown in FIG. 2, each access device 220 may be associated with at least one user (e.g., users 230-1 through 230-3, collectively referred to herein as "users 230"). As will be described in more detail below, each user 230 may virtually connect or otherwise communicate or interact with other users 230 using social networking subsystem 110. Moreover, each user 230 may provide and/or access content stored within social network subsystem 110 via one or more of the access devices 220.

In some examples, one or more of the users 230 may be subscribers to or users of one or more services provided over network 225. For example, one or more of the users 230 may be subscribers to a particular social networking service and/or a wireless telephone service. Other services may be provided over network 225 as may serve a particular application.

Social network subsystem 110 may be configured to support communication with access subsystem 120 via multiple network platforms. For example, user 230 may utilize multiple access devices 220, each a part of a different network platform, to interact with social network subsystem 110.

Figure 3:
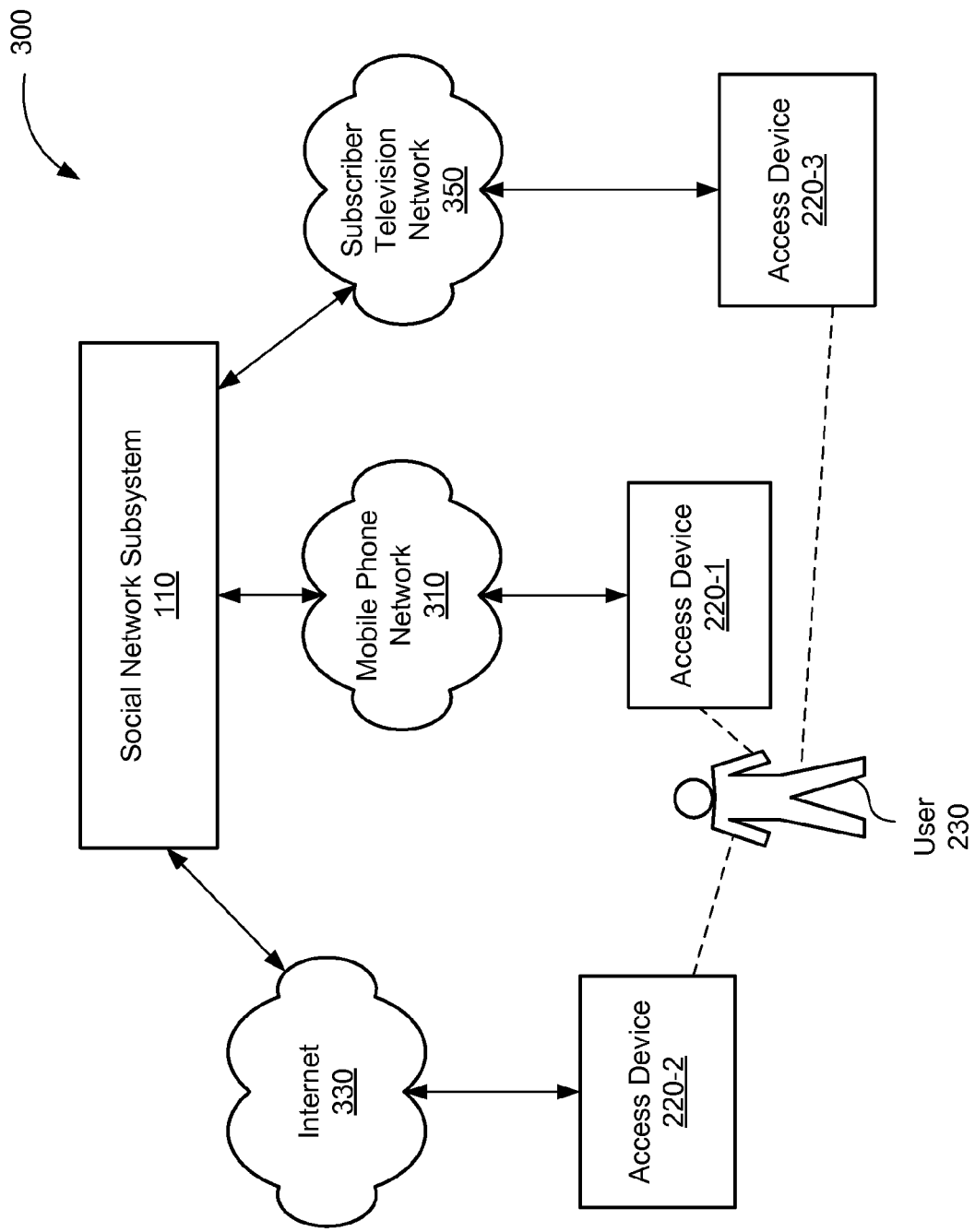
FIG. 3 shows another exemplary implementation of the system of FIG. 1 according to principles described herein.

To illustrate, FIG. 3 shows an exemplary implementation 300 of system 100. As shown in FIG. 3, the implementation 300 may include social network subsystem 110 and access devices 220-1 through 220-3 associated with user 230. Social network subsystem 110 may be configured to communicate with each access device 220 over a different network platform. For example, social network subsystem 110 may be configured to communicate with access device 220-1 (e.g., a mobile phone) over a mobile phone network 310, with access device 220-2 (e.g., a personal computer) over the Internet 330, and/or with access device 220-3 (e.g., a set-top box) over subscriber television network 350. Hence, user 230 may be able to utilize any of the access devices 220-1 through 220-3 to provide and/or access content stored within social network subsystem 110. It will be recognized that mobile phone network 310, the Internet 330, and subscriber television network 350 may be part of network 225 shown in FIG. 2. It will also be recognized that the networks shown in FIG. 3 are merely illustrative of the many different types of networks that may facilitate communication between social network subsystem 110 and access subsystem 120.

Figure 4:
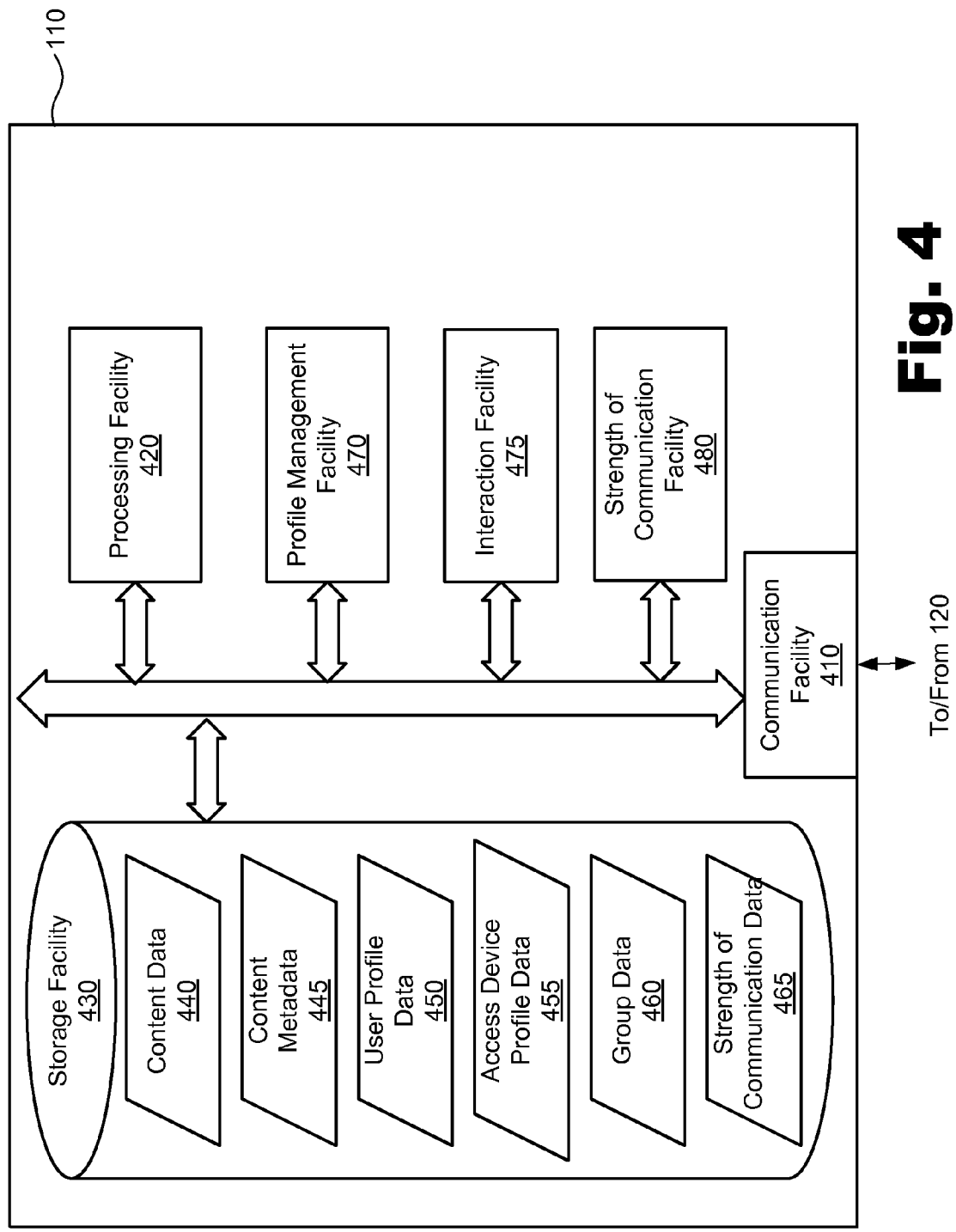
FIG. 4 illustrates components of an exemplary social network subsystem according to principles described herein.

FIG. 4 illustrates components of an exemplary social network subsystem 110. The components of social network subsystem 110 may include or be implemented as hardware, computing instructions (e.g., software) embodied on a computer-readable medium, or a combination thereof. In certain embodiments, for example, one or more components of social network subsystem 110 may include or be implemented on one or more servers, such as server 210, configured to communicate over network 225. While an exemplary social network subsystem 110 is shown in FIG. 4, the exemplary components illustrated in FIG. 4 are not intended to be limiting. Indeed, additional or alternative components and/or implementations may be used.

As shown in FIG. 4, social network subsystem 110 may include a communication facility 410, which may be configured to communicate with access subsystem 120, including receiving data representative of content, data representative of social networking commands, and content data operations from access subsystem 120 and/or any other device or subsystem. Communication facility 410 may additionally or alternatively be configured to transmit content, social networking commands, and/or any other data to access subsystem 120 and/or any other device or subsystem by way of network 225. The communication facility 410 may include and/or support any suitable communication platforms and technologies for communicating with and transporting content and associated data to/from access subsystem 120. Communication facility 410 may be configured to support a variety of communication platforms, protocols, and formats such that social network subsystem 110 can receive data from and distribute data to a variety of computing platforms (e.g., a mobile telephone service platform, a web-based platform, a subscriber television platform, etc.) using a variety of communications technologies. Accordingly, the social network subsystem 110 may be configured to support a multi-platform system in which data can be received from and provided to diverse platforms.

Social network subsystem 110 may include a processing facility 420 configured to control operations of components of the social network subsystem 110. Processing facility 420 may execute or direct execution of operations in accordance with computer-executable instructions stored to a computer-readable medium such as a storage facility 430. As an example, processing facility 420 may be configured to process data and/or communications received from or to be transmitted to access subsystem 120.

In some examples, processing facility 420 may be configured to perform device-specific content formatting before content is provided to (e.g., downloaded by) a particular access device 220. In this manner, the content may be optimally viewed or otherwise experienced by a user of the access device 220.

Storage facility 430 may include one or more data storage media, devices, or configurations and may employ any type, form, and combination of storage media. For example, the storage facility 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Storage facility 430 may store any suitable type or form of electronic data, including content data 440, content metadata 445, user profile data 450, access device profile data 455, group data 460, and/or strength of communication data 465.

Content data 440 may include or be stored within one or more content instances. As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), email contacts, video, audio, multimedia, video games, or any segment, component, or combination of these or other forms of electronic data that may be viewed or otherwise experienced by a user. Content metadata 445 may include metadata associated with one or more of the content instances.

User profile data 450 may include any information descriptive of one or more users who are associated with social network subsystem 110 and/or otherwise receive services provided over network 225. User profile data 450 may include user authentication information, user identifiers, information about one or more access devices 120 that correspond with a user 230, user preferences, and/or any other information related to one or more users. User profile data 450 corresponding to a particular user 230 may additionally or alternatively include contact information corresponding to one or more users 230 virtually connected to or otherwise associated with the user 230.

Access device profile data 455 may include any information descriptive of access subsystem 120 and/or any access device 220 configured to communicate with social network subsystem 110. For example, access device profile data 455 may include data representative of one or more access device identifiers, network addresses (e.g., internet protocol ("IF") addresses), network resources, computing resources, subscription information, device permissions, platforms, etc.

Group data 460 may include any information that can be used to identify groupings of users 230 and/or access devices 220. For example, group data 460 may include information indicating that certain users 230 are members of a group within a particular social network. Accordingly, group data 460 may be useful for facilitating selective access of content data 440 by users 230 within a group and/or selective communications between users 230 within a group. In certain embodiments, group data 460 may include information that can be used to access user profile data 450 corresponding to users in a group, and the user profile data 450 may include information that can be used to identify user associations with access devices 120.

Group data 460 may be defined in any suitable manner, including users (e.g., a member of a particular social network) defining groups and providing data representative of the defined groups to social network subsystem 110. For example, a user may specify one or more social networking connections and provide the social networking connections to social network subsystem 110 in the form of group data 460.

In certain embodiments, at least certain groups are defined based on user subscription accounts for services provided over network 225. For example, a default group may be defined by social network subsystem 110 to include any users associated with a subscription account (e.g., a social networking account).

Strength of communication data 465 may include any data associated with a communication strength between a user 230 and one or more other users 230. For example, strength of communication data 465 may be representative of an amount, frequency, type, relative quality, source, and/or duration of one or more communications between a user 230 and another user 230. As used herein, an "amount" of communications refers to a quantity of communications initiated by either of the users 230, a "frequency" of communications refers to how often the communications are initiated by either of the users 230 (e.g., hourly, daily, monthly, etc.), a "type" of communications refers to a particular communication mode used to communicate (e.g., phone calls, SMS messages, etc.), a "relative quality" of communications refers to a relative significance of one type of communication compared to another (e.g., a phone call may be weighted to be more relatively significant than an SMS message), a "source" of communications refers to a particular user 230 and/or access device 220 that initiates the communications, and a "duration" of communications refers to an amount of time that elapses during one or more communications between the users 230.

As will be described in more detail below, one or more graphics based on the strength of communication data 465 and configured to represent a strength of communication between a user 230 and one or more other users 230 may be generated and displayed by access subsystem 120. As one or more factors associated with one or more communications between a user 230 and one or more other users 230 change, the strength of communication data 465 may be updated accordingly.

In certain embodiments, data 440-465 may be stored using one or more suitable data entities and/or structures, including one or more relational or hierarchical data tables, for example.

Social network subsystem 110 may include a profile management facility 470, which may be configured to manage one or more user profiles and/or access device profiles and/or maintain a database of permissions associated therewith. For example, profile management facility 470 may be configured to facilitate updating of a user profile and/or an access device profile by a user. In some examples, one or more user profiles and/or access device profiles may be managed within the access subsystem 120.

Social network subsystem 110 may further include an interaction facility 475, which may be configured to provide one or more functions configured to facilitate social networking interactions between users 230. Exemplary functions that may be provided by interaction facility 475 may include, but are not limited to, providing interfaces wherein users 230 may communicatively interact with each other (e.g., via phone calls, VOIP, emails, SMS messages, MMS messages, instant messages, and/or other communication mediums), making content accessible to different users 230 within a particular social network or group, providing content recommendations to one or more users 230, maintaining one or more databases of user permissions and/or privileges, and/or any other function associated with social networking interactions.

Social network subsystem 110 may further include a strength of communication facility 480, which may be configured to detect, derive, and/or otherwise extrapolate strength of communication data 465 in accordance with a predefined strength of communication heuristic. The predefined strength of communication heuristic may be based at least in part on any factor associated with one or more communications between a user 230 and one or more other users 230. For example, the predefined strength of communication heuristic may be based on an amount, frequency, type, relative quality, source, and/or duration of one or more communications between a user 230 and one or more other users 230.

To illustrate, strength of communication facility 480 may be configured to monitor incoming and outgoing communications corresponding to a particular access device 220 and detect an amount, frequency, type, relative quality, source, and/or duration of the communications. The detected information may then be used to generate strength of communication data 465 corresponding to a user 230 of the access device 220.

Strength of communication facility 480 may include or be implemented as hardware, computing instructions (e.g., software) tangibly embodied on a computer-readable medium, or a combination of hardware and computing instructions configured to perform one or more of the processes described herein. In certain embodiments, strength of communication facility 480 may be implemented as a software application embodied on a computer-readable medium such as storage facility 430 and configured to direct the processing facility 420 to execute one or more of the processes described herein.

Strength of communication facility 480 is shown in FIG. 4 to be residing within social network subsystem 110 for illustrative purposes only. It will be recognized that strength of communication facility 480 may additionally or alternatively reside within access subsystem 120 (e.g., within one or more of the access devices 220).

Figure 5:
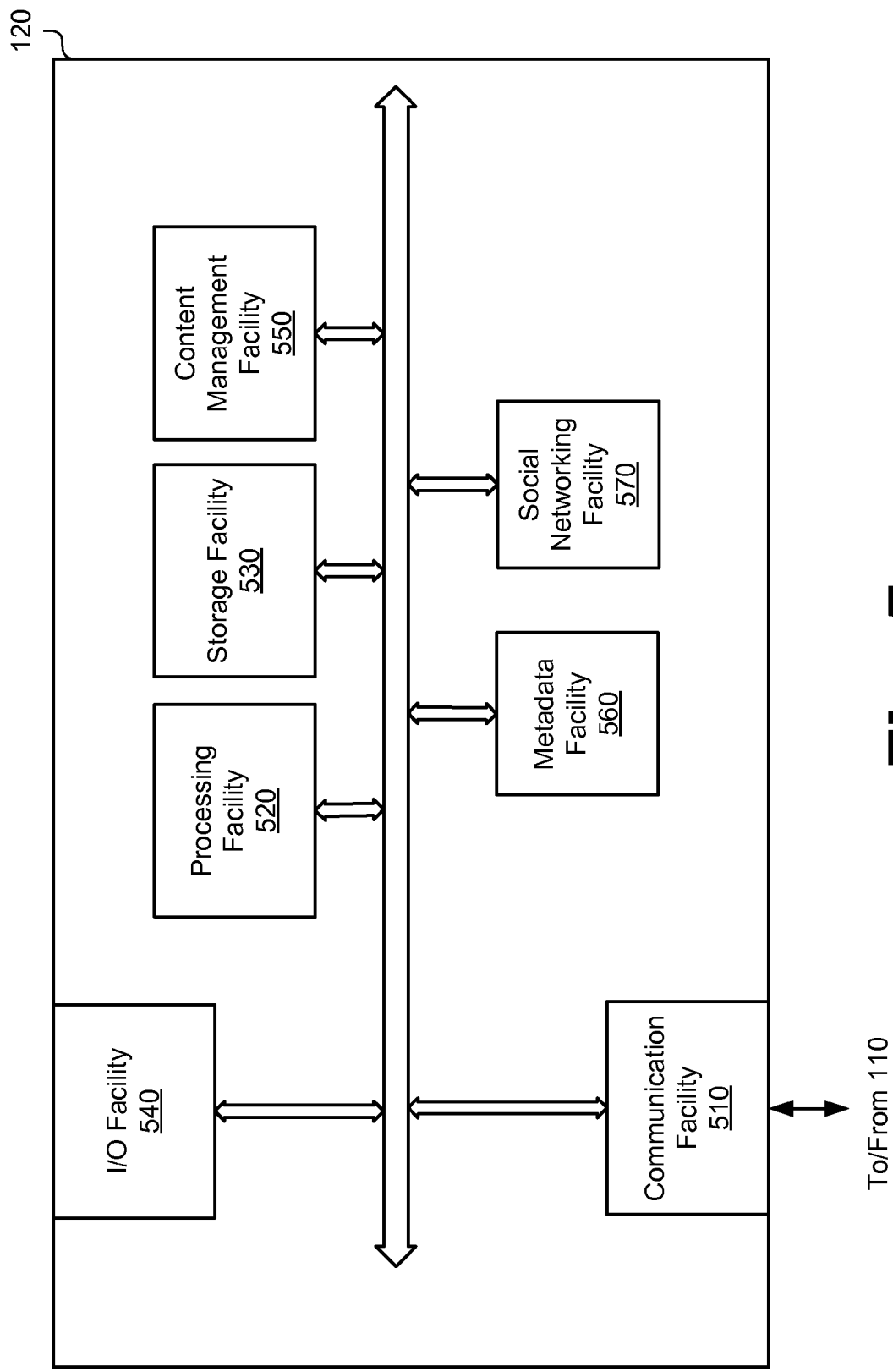
FIG. 5 illustrates components of an exemplary access subsystem according to principles described herein.

FIG. 5 illustrates components of an exemplary access subsystem 120. As shown in FIG. 5, access subsystem 120 may include a communication facility 510, processing facility 520, storage facility 530, input/output ("I/O") facility 540, content management facility 550, metadata facility 560, and social networking facility 570 communicatively connected to one another. The facilities 510-570 may be communicatively connected using any suitable technologies. Each of the facilities 510-570 may be implemented as hardware, computing instructions (e.g., software) tangibly embodied on a computer-readable medium, or a combination of hardware and computing instructions configured to perform one or more of the processes described herein. In certain embodiments, for example, social networking facility 570 and/or one or more other facilities may be implemented as one or more software applications embodied on a computer-readable medium such as storage facility 530 and configured to direct processing facility 520 of the access subsystem 120 and/or processing facility 420 of the social network subsystem 110 to execute one or more of the processes described herein.

Communication facility 510 may be configured to communicate with social network subsystem 110 (e.g., over network 225), including sending and receiving data representative of content, data associated with content, content management commands, social networking commands, and/or other communications to/from social network subsystem 110. Communication facility 510 may include any device, logic, and/or other technologies suitable for transmitting and receiving such data. In certain embodiments, communication facility 510 may be configured to support other network service communications over network 225, including wireless voice, data, and messaging service communications, for example. Communication facility 510 may be configured to interface with any suitable communication media, protocols, formats, platforms, and networks, including any of those mentioned herein.

Processing facility 520 may be configured to execute and/or direct execution of operations of one or more components of the access subsystem 120. Processing facility 520 may direct execution of operations in accordance with computer-executable instructions such as may be stored in storage facility 530, storage facility 430, or another computer-readable medium.

Storage facility 530 may include one or more data storage media, devices, or configurations and may employ any type, form, and combination of storage media. For example, the storage facility 530 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the storage facility 530.

Different types of data may be maintained within storage facility 530 as may serve a particular application. For example, content data 440, user profile data 450, access device profile data 455, group data 460, and/or strength of communication data 465 may be maintained by storage facility 530. It will be recognized that data stored within storage facility 530 may additionally or alternatively be stored within storage facility 430 and/or within any other storage medium as may serve a particular application.

I/O facility 540 may be configured to receive user input and provide user output and may include any hardware, firmware, software, or combination thereof supportive of input and output capabilities. For example, I/O facility 540 may include one or more devices for capturing or otherwise creating content, including, but not limited to, a still-shot camera, video camera, scanner, microphone, keyboard or keypad, touch screen component, and/or receiver (e.g., an RF or infrared receiver). Accordingly, a user 230 of access subsystem 120 may create or otherwise acquire content (e.g., by taking a picture, creating a word processing document, or downloading a data file). In some examples, the acquired content may be provided to social network subsystem 110 and/or to another access device 220.

I/O facility 540 may include one or more devices for presenting content for experiencing by the user 230, including, but not limited to, a graphics engine, a display, one or more display drivers, one or more audio speakers, and one or more audio drivers. Accordingly, I/O facility 540 may present content (e.g., play back and/or display) for experiencing by the user 230. I/O facility 540 may also be configured to provide other output for the user 230, such as graphical user interfaces.

Content management facility 550 may be configured to provide one or more tools for management of content. The tools may include or be provided using hardware, computer-readable instructions embodied on a computer-readable medium such as storage facility 530, or a combination of hardware and computer-readable instructions. In certain embodiments, content management facility 550 may be implemented as a software application embodied on a computer-readable medium such as storage facility 530 and configured to direct the processing facility 520 of the access subsystem 120 to execute one or more of the content management operations described herein.

The tools may be configured to enable user 230 to create, format, modify, delete, annotate (e.g., edit, rate, label, add a note to, comment about, and categorize content), access, retrieve, copy, move, send, request, receive, decrypt, and/or otherwise manage content stored within access subsystem 120 and/or social network subsystem 110. For example, a user 230 utilizing the content management tools may create and provide a content instance to social network subsystem 110. Through content management facility 550, the user 230 may access and manage the content instance. Content management facility 550 may generate and provide content management commands to social network subsystem 110, which may be configured to receive and process the commands, and to identify and perform appropriate content management operations based on the commands.

In some examples, the one or more tools provided by content management facility 550 may include one or more application clients configured to facilitate access to content stored within or received from social network subsystem 110. Exemplary application clients may include, but are not limited to, Internet browsers, image viewers, media players, and/or document readers and editors.

Metadata facility 560 may be configured to perform operations associated with content metadata, including generating, updating, and providing content metadata. The term "metadata" as used herein refers generally to any electronic data descriptive of content and/or content instances. For example, metadata may include, but is not limited to, content instance identifiers (e.g., file names), time data, strength of communication data, user data, source data, destination data, size data, creation data, modification data, data structure data, and access data descriptive of content and/or one or more content instances. Examples of metadata may include time data associated with a data operation (e.g., creating, modifying, deleting, receiving, or sending content), strength of communication data associated with a data operation (e.g., a geographic or network location at which content is created), user data identifying one or more users associated with content (e.g., a user who created, modified, deleted, sent, received, accessed, or otherwise operated on or is owner of content), content type information (e.g., file type or other predefined category of content), content transport information, source data associated with a source of content (e.g., a user from whom content is received), and destination data associated with a destination to which content is sent (e.g., a user to whom content is transmitted).

Metadata facility 560 may include hardware, computer-readable instructions embodied on a computer-readable medium such as storage facility 530 (e.g., one or more content management software applications), or a combination of hardware and computer-readable instructions. In certain embodiments, metadata facility 560 may be implemented as a software application embodied on a computer-readable medium such as storage facility 530 and configured to direct the processing facility 520 of the access subsystem 120 to execute one or more of metadata operations described herein.

Metadata facility 560 may be configured to detect content management operations and to generate, update, delete, and/or provide metadata associated with the operations. For example, if a content instance is transmitted to a destination, such as by transmitting data representative of the content instance over network 225, metadata facility 560 may detect the transmission of the content instance and generate and provide metadata indicating a time at which the content instance is sent and the destination to which the content instance is sent (e.g., a user or remote device identifier). Similarly, if another content instance is received by access subsystem 120 from a source (e.g., social network subsystem 110), metadata facility 560 may detect the receipt of the other content instance and generate and provide metadata indicating a time at which the other content instance is received and the source that provided the other content instance.

Social networking facility 570 may be configured to facilitate social networking interactions between users 230. Social networking facility 570 may include hardware, computer-readable instructions embodied on a computer-readable medium such as storage facility 530 (e.g., one or more software applications), or a combination of hardware and computer-readable instructions. In certain embodiments, social networking facility 570 may be implemented as a software application embodied on a computer-readable medium such as storage facility 530 and configured to direct the processing facility 520 of the access subsystem 120 to execute one or more operations described herein. In some examples, social networking facility 570 may facilitate the transmission and receipt of phone calls, VOIP, emails, SMS messages, MMS messages, instant messages, and/or other communications between users 230. It will be recognized that one or more functions of social networking facility 570 may be additionally, alternatively, or cooperatively performed by interaction facility 475 located within social network subsystem 110.

Various features, embodiments, and applications of strength of communication facility 480 will now be described. It will be recognized that the features, embodiments, and applications described herein are merely illustrative, and that strength of communication facility 480 may be configured to perform additional or alternative functions as may serve a particular application.

As mentioned, strength of communication facility 480 may be configured to detect, derive, and/or otherwise extrapolate strength of communication data 465. In some examples, strength of communication facility 480 may be further configured to generate and direct one or more other facilities to display a graphic configured to represent a strength of communication between a user 230 and one or more other users 230. Alternatively, strength of communication facility 480 may be configured to direct processing facility 520 to generate the graphic. The graphic may be based on the strength of communication data 465 and generated in accordance with a predefined strength of communication heuristic (or simply "heuristic"). The graphic may allow a user 230 to see or visualize how the user 230 interacts with one or more other users 230. The user 230 may utilize the information conveyed by the strength of communication graphic to modify the way in which the user 230 communicates with others, identify irregular communication trends or patterns, and/or learn more about his or her communication habits and/or the communication habits of one or more other users 230.

Figure 6:
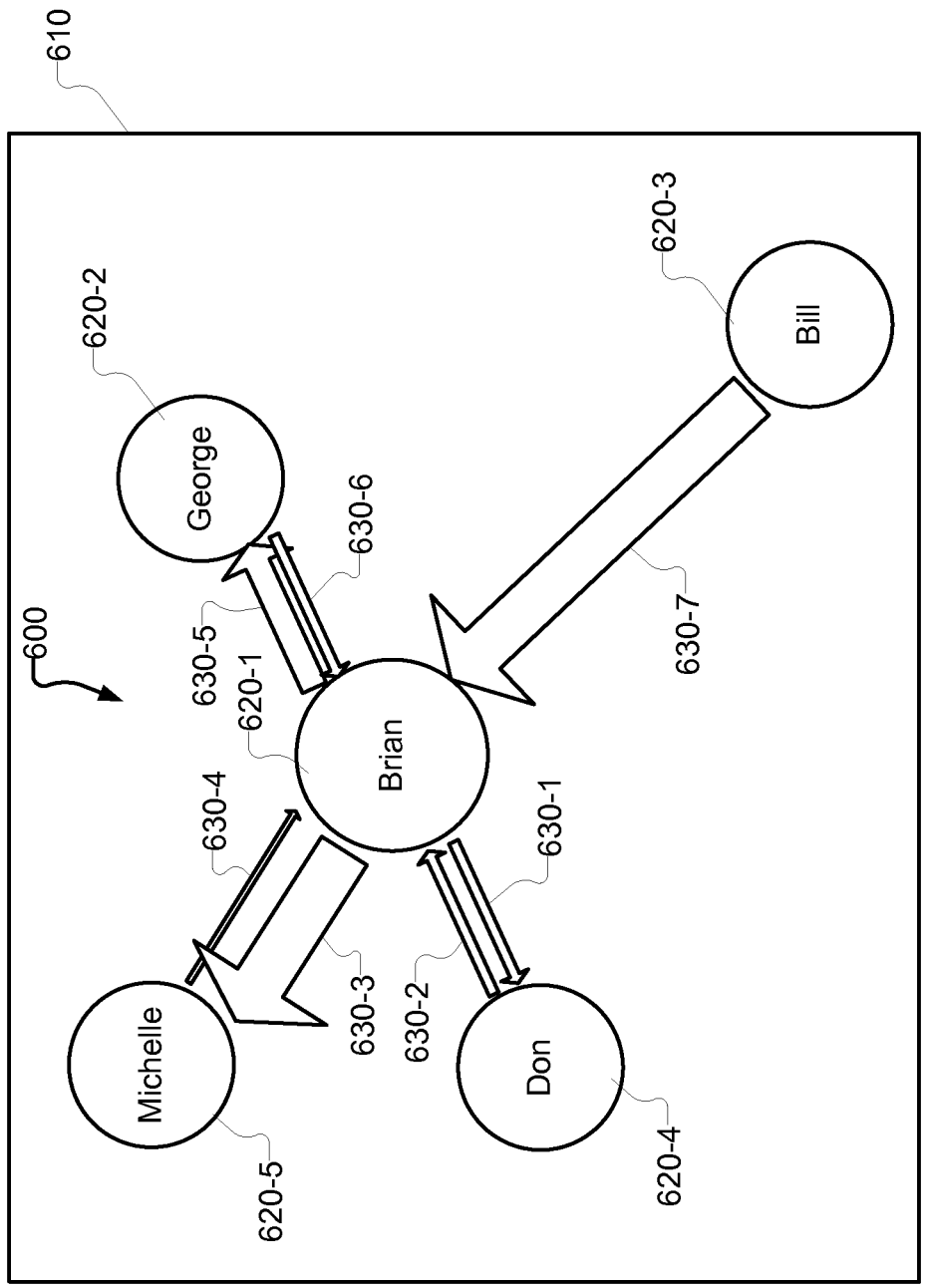
FIG. 6 illustrates an exemplary strength of communication graphic that may be generated and displayed by an access device according to principles described herein.

FIG. 6 illustrates an exemplary strength of communication graphic 600 (also referred to herein as "graphic 600"). Graphic 600 may be displayed within a viewing area 610 of a display that may be a part of an access device 220 or any other device as may serve a particular application.

As shown in FIG. 6, graphic 600 may include a one or more objects (e.g., 620-1 through 620-5, collectively referred to herein as "objects 620") representing various users 230 and/or user profiles associated with each other in some way. For example, object 620-1 represents a user 230 named "Brian", and objects 620-2 through 620-5 represent users 230 connected in some way to Brian who are named "George", "Bill", "Don", and "Michelle", respectively. The user 230 named "Brian" will be referred to herein for illustrative purposes as the "central user 230" to distinguish that user 230 from the other users 230. The number of objects 620 included within graphic 600 may vary depending on the number of people within Brian's social network, available space within viewing area 610, and/or any other factor as may serve a particular application.

The size, shape, and/or color of each object 620 may vary as may serve a particular application. For example, each object 620 may include a circle having a size representative of a level of relationship to central user 230. To illustrate, object 620-1 is depicted as a circle having a larger circumference than objects 620-2 through 620-5 to differentiate between the user 230 named "Brian" and the other users 230 connected to Brian. It will be recognized that objects 620 may additionally or alternatively be represented by other shapes or sizes as may serve a particular application. For example, each object 620 may be represented by an avatar, rectangle, text, etc.

Each of the users 230 represented by objects 620-2 through 620-5 may be connected to the central user 230 (e.g., Brian) within a social network, contact list, email list, instant messaging list, phone call log, or other grouping of users 230. Hence, references to a user 230 being "connected" to another user 230 mean that the two users 230 are connected to each other in some way, e.g., through a social network, contact list, email list, instant messaging list, phone call log, or other grouping of users 230.

As shown in FIG. 6, objects 620-2 through 620-5 may be located at different distances away from object 620-1. These distances may be representative of a level of relationship with the central user 230 (e.g., friendship, acquaintance, or any other factor). For example, users Don, Michelle, and George may be designated by Brian as being close friends or contacts, while user Bill may be designated as a distant contact.

As shown in FIG. 6, graphic 600 may include one or more arrows (e.g., arrows 630-1 through 630-7, collectively referred to herein as "arrows 630") configured to represent a strength of communication between the central user 230 (e.g., Brian) and the other users 230 (e.g., Don, Michelle, George, and Bill). While arrows 630 are shown in FIG. 6, it will be recognized that other suitable shapes or objects may be used to represent a strength of communication between one or more users 230 as may serve a particular application.

In certain examples, a strength of communication between two users 230 (e.g., Brian and Don) may be represented by two arrows 630. A first arrow (e.g., arrow 630-1) may be configured to represent communications initiated by one of the users 230 (e.g., Brian) and a second arrow (e.g., arrow 630-2) may be configured to represent communications initiated by the other user 230 (e.g., Don). In this manner, a user 230 may compare the strength of incoming versus outgoing communications with another user 230. As will be described in more detail below, a strength of communication between two users 230 may alternatively be represented by a single arrow 630 or any other number of arrows 630 as may serve a particular application.

In some examples, one or more attributes of the arrows 630 may be defined to convey strength of communication information to a user 230. For example, a size (e.g., width), shape, color, length, and/or other attribute may be defined to convey strength of communication information to a user 230.

To illustrate, arrows 630-1 and 630-2 are of equal width. Hence, arrows 630-1 and 630-2 may convey to a user 230 that communications initiated by Brian towards Don are substantially similar in strength to communications initiated by Don towards Brian. For example, users Brian and Don may initiate a substantially equal amount of telephone calls, emails, SMS messages, instant messages, and/or other communications to each other.

In another example, arrows 630-3 and 630-4 represent strength of communications between users Brian and Michelle. As shown in FIG. 6, arrow 630-3 is relatively wider than arrow 630-4, which may convey to a user 230 that communications initiated by Brian towards Michelle are relatively stronger than communications initiated by Michelle towards Brian. For example, Brian may initiate more calls, emails, SMS messages, instant messages, and/or other communications towards Michelle than Michelle initiates towards Brian.

In another example, a single arrow 630-7 is shown between users Brian and Bill. The arrow points towards Brian and therefore shows that Bill initiates substantially all of the communications between Brian and Bill.

Hence, graphic 600 may provide an intuitive and effective way of conveying relative strengths of communications between a user 230 and one or more other users. A user 230 may utilize graphic 600 to recognize communication patterns, tendencies, and/or habits and adjust his or her communication behavior accordingly.

For example, the user 230 named "Brian" may view graphic 600 and recognize that he initiates most of the communications that occur between him and the user 230 named "Michelle". Brian may utilize this information to conscientiously limit the number of communications that he initiates towards Michelle so that Michelle does not think that he is being overly aggressive or annoying.

Additionally or alternatively, Brian may view graphic 600 and recognize that he has failed to respond to any of the communications initiated by the user 230 named "Bill". Brian may use this information to make more of an effort to communicate with Bill or to block the repeated communication attempts initiated by Bill.

Figure 7:
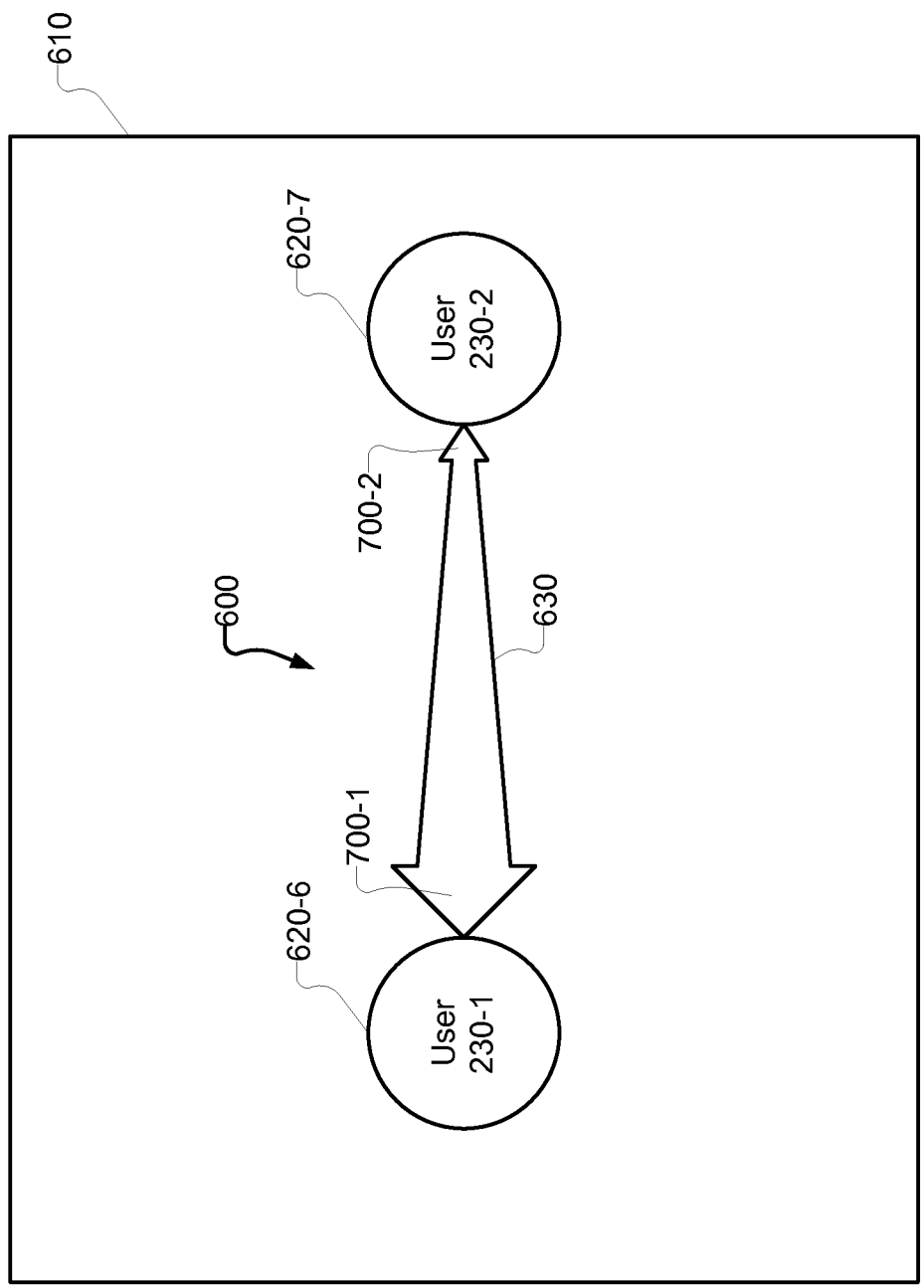
FIG. 7 illustrates a single arrow that may be included within the strength of communication graphic and configured to represent a strength of communication between first and second users according to principles described herein.

As mentioned, a strength of communication between users 230 may be represented by a single arrow 630. For example, FIG. 7 illustrates a single arrow 630 that may be included within graphic 600 and configured to represent a strength of communication between first and second users 230-1 and 230-2. Objects 620-6 and 620-7 are configured to represent first and second users 230-1 and 230-2, respectively. As shown in FIG. 7, the single arrow 630 includes two heads 700-1 and 700-2, collectively referred to herein as "heads 700". The size or any other attribute of each head 700 may be defined to represent strength of communications initiated by each of the users 230 to one another. For example, head 700-1 is relatively larger than head 700-2, which may convey that communications initiated by the second user 230-2 towards the first user 230-1 are relatively stronger (e.g., greater in number, frequency, duration, and/or relative quality) than communications initiated by the first user 230-1 towards the second user 230-2.

Figure 8:
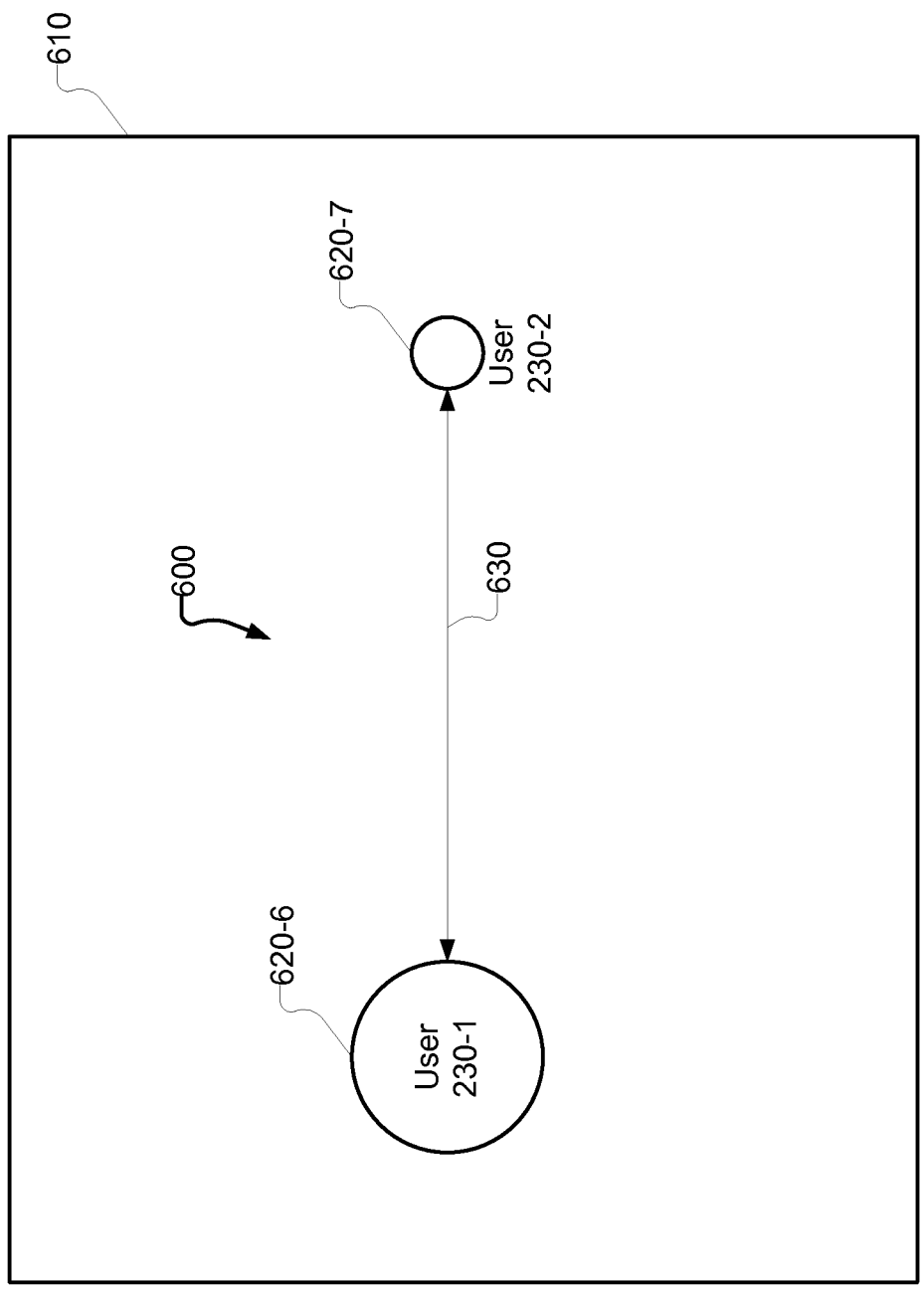
FIG. 8 illustrates a strength of communication graphic wherein a size of the objects representing first and second users is configured to represent a strength of communication between the two users according to principles described herein.

A strength of communication between users 230-1 and 230-2 may alternatively be represented in any other suitable manner. For example, FIG. 8 illustrates a strength of communication graphic 600 wherein a size of the objects 620 representing the first and second users 230-1 and 230-2 is configured to represent a strength of communication between the two users 230. As shown in FIG. 8, objects 620-6 and 620-7 are configured to represent the first and second users 230-1 and 230-2, respectively. An arrow 630 may be disposed between the objects 620-6 and 620-7 to represent that the first and second users 230-1 and 230-2 are connected. Object 620-6 may be relatively larger than object 620-7, as shown in FIG. 8, to convey that communications initiated by the first user 230-1 towards the second user 230-2 are relatively stronger than communications initiated by the second user 230-2 towards the first user 230-1.

As mentioned, the strength of communication graphic 600 may be based on strength of communication data 465 and generated in accordance with a predefined heuristic. In some examples, the predefined heuristic may be configured to weight one or more factors associated with communications between users 230 such that one type of communication is relatively more significant than another. To illustrate, a telephone call may be weighted more than a SMS message and thus influence the generation of the strength of communication graphic 600 more than the SMS message. It will be recognized that any suitable weighting algorithm may be used by the predefined heuristic as may serve a particular application.

Additionally or alternatively, the predefined heuristic may be configured to direct the strength of communication facility 480 to modify the strength of communication graphic 600 in response to a change in one or more factors associated with communications between users 230. To illustrate, FIG. 9A shows an exemplary strength of communication graphic 600 that may be configured to convey a strength of communications between a first user 230-1 (represented by object 620-6) and a second user 230-2 (represented by object 620-7). As shown in FIG. 9A, an arrow 630 interconnecting objects 620-6 and 620-7 may be relatively wide, thus conveying that communications initiated by the first user 230-1 towards the second user 230-2 are relatively strong.

Figure 9B:
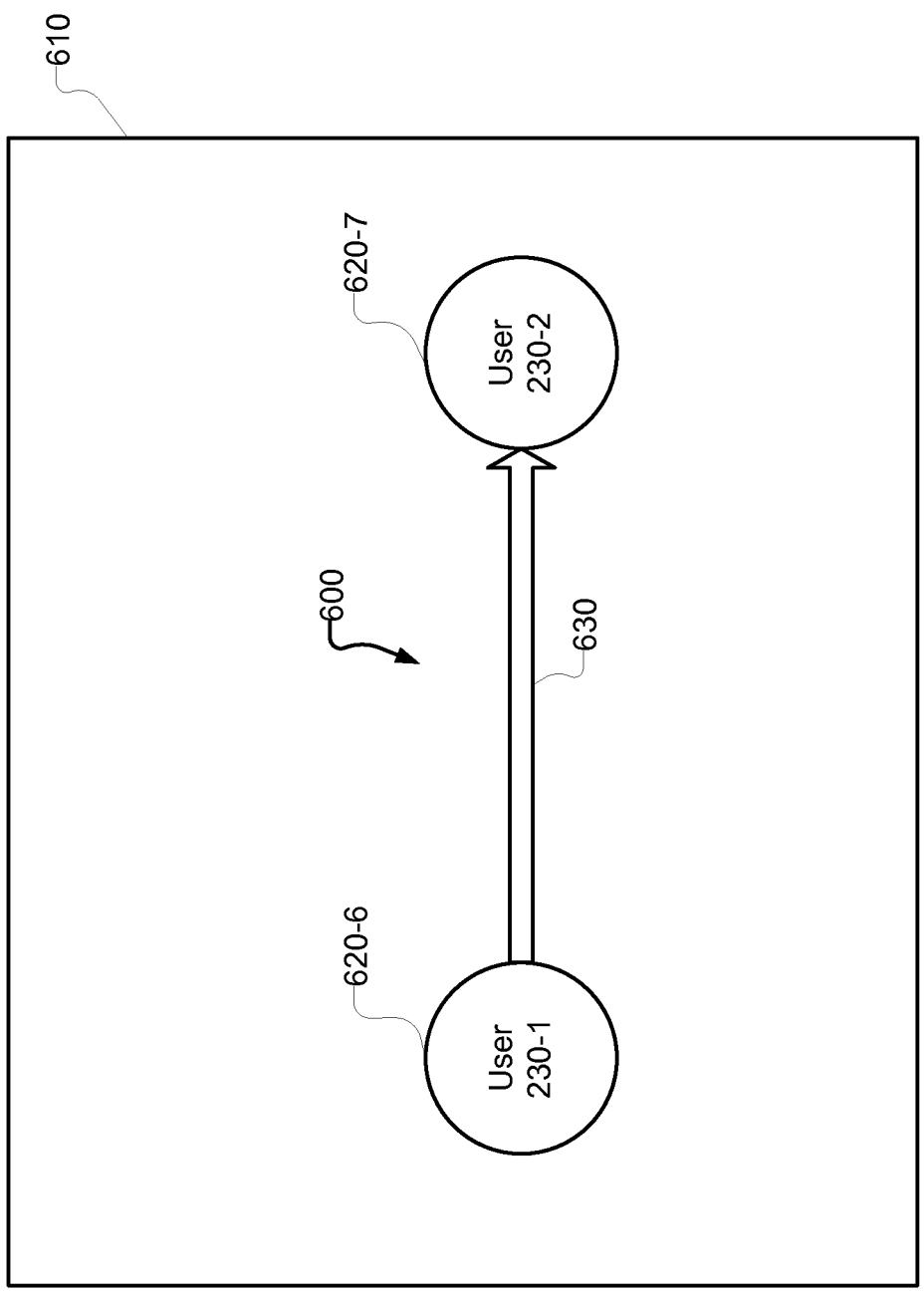
FIG. 9B shows a modified graphic configured to convey a decrease in communication strength according to principles described herein.

Over time, the communications initiated by the first user 230-1 towards the second user 230-2 may dwindle. Additionally or alternatively, the communications initiated by the first user 230-1 may decrease in weighted quality as defined by the strength of communication heuristic. Such a decrease in strength of communication may be conveyed by modifying or adjusting the width of arrow 630. To illustrate, FIG. 9B shows that the width of the arrow 630 has been reduced, thus conveying the decrease in communication strength.

FIG. 10A illustrates a configuration wherein the strength of communication graphic 600 may be configured to convey to a first user 230-1 that a second user 230-2 unknown to the first user 230-1 has attempted to communicate with the first user 230-1. For example, the first user 230-1 (represented by object 620-6) may receive a phone call from the second user 230-2 (represented by object 620-7) having a phone number that is unrecognizable to the first user 230-1. A dashed line 1000 connecting objects 620-6 and 620-7 may be displayed within graphic 600 to convey that the second user 230-2 has attempted to communicate with the first user 230-1 without the first user 230-1 accepting or replying to the communication. The dashed line 1000 may further convey to the first user 230-1 that the second user 230-2 has never before attempted to communicate with the first user 230-1.

In some examples, the strength of communication graphic 600 shown in FIG. 10A may be modified to convey to the first user 230-1 that the second user 230-2 is connected in some way to a friend, acquaintance, or other contact of the first user 230-1. For example, FIG. 10B shows a strength of communication graphic 600 that includes an object 620-8 corresponding to a third user 230-3 that is connected to the first user 230-1 by strength of communication arrows 630-8 and 630-9. As shown in FIG. 10B, strength of communication arrows 630-10 and 630-11 may also be included within graphic 600 and configured to represent a strength of communication between the second user 230-2 and the third user 230-3. In this manner, the first user 230-1 may see that the unknown second user 230-2 is connected to the known third user 230-3 and decide whether to return the telephone call to the second user 230-2 or otherwise communicate with the second user 230-2.

Figure 10C:
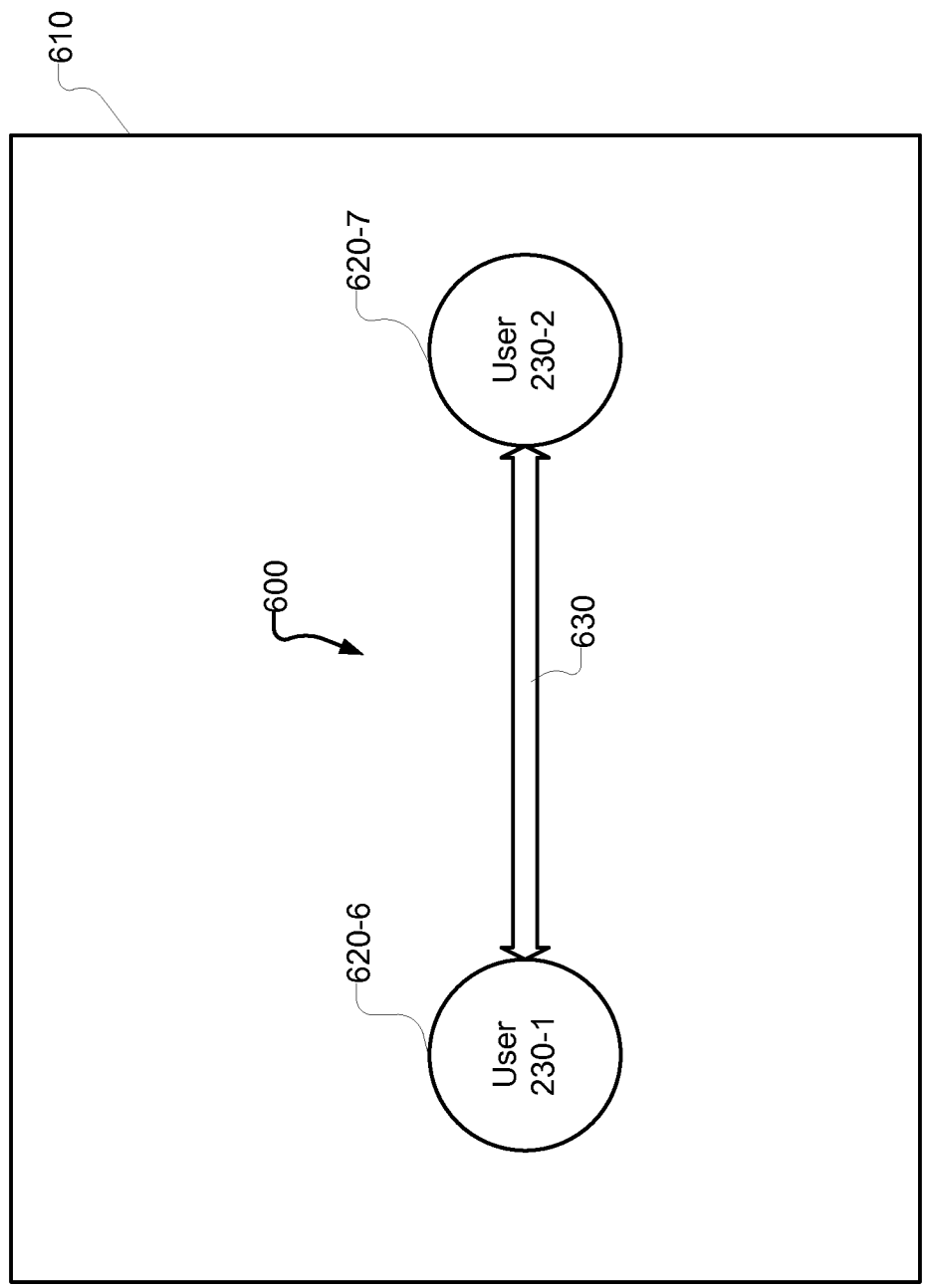

FIG. 10C shows a strength of communication graphic 600 that may be displayed after the first user 230-1 has accepted and/or initiated communication with the second user 230-2. As shown in FIG. 10C, the dashed line 1000 connecting objects 620-6 and 620-7 has been replaced with a strength of communication arrow 630.

In some examples, one or more of the objects 620 included within a strength of communication graphic 600 may be selected to access one or more options associated with one or more corresponding users 230. It will be recognized that an object 620 may be selected in any suitable manner as may serve a particular application.

Figure 11:
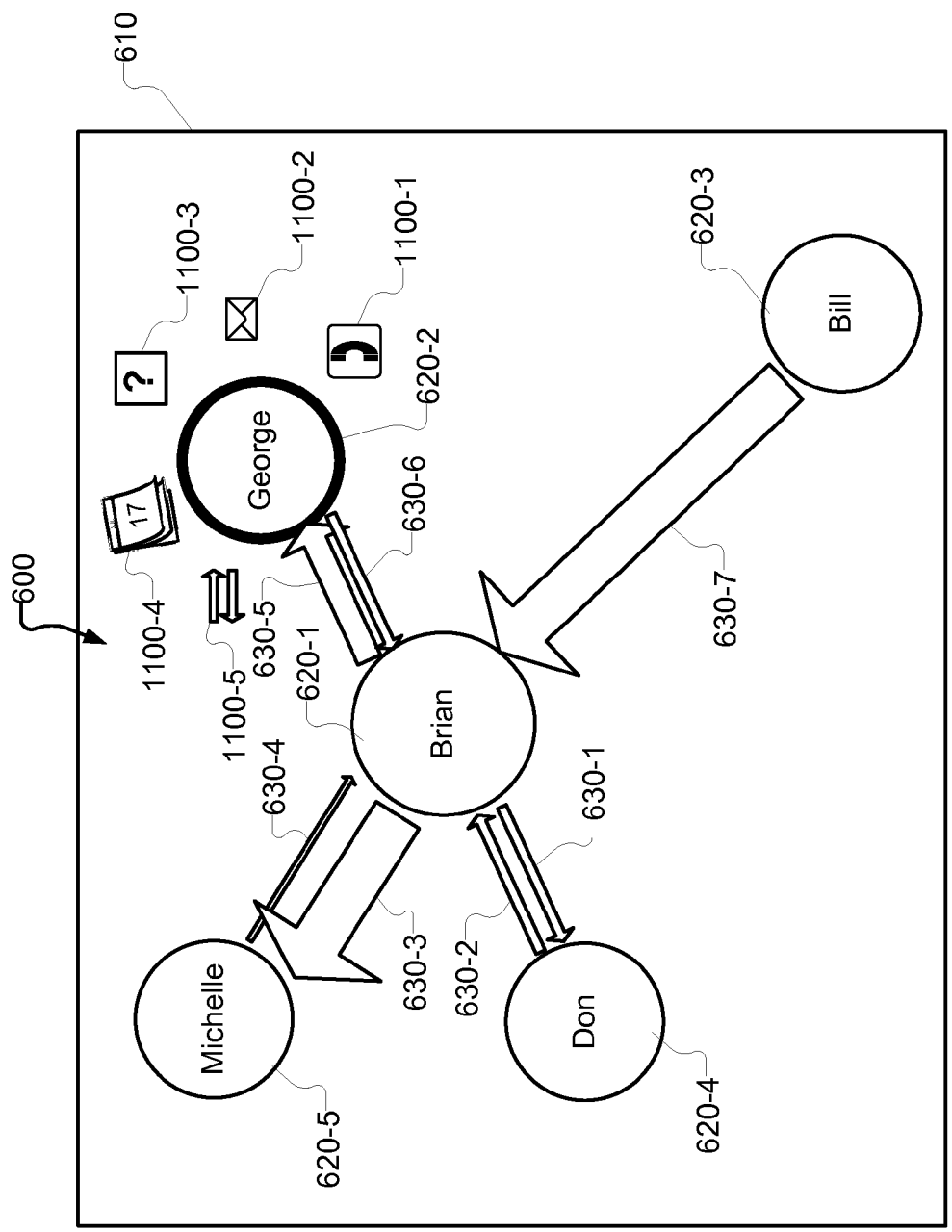
FIG. 11 shows a strength of communication graphic with a selected object included therein according to principles described herein.

To illustrate, FIG. 11 shows the strength of communication graphic 600 with object 620-2 selected. As shown in FIG. 11, one or more selectable options 1100-1 through 1100-5 (collectively referred to herein as "selectable options 1100") associated with the selected object 620-2 may be displayed within graphic 600. Options 1100 may include an option to call the user 230 associated with the selected object 620-2 (e.g., object 1100-1), an option to send a message to the user 230 associated with the selected object 620-2 (e.g., object 1100-2), an option to access information contained with the user's profile (e.g., object 1100-3), an option to make an appointment with the user 230 associated with the selected object 620-2 (e.g., object 1100-4), an option to view communication statistics associated with the user 230 (e.g., object 1100-5), and/or any other option as may serve a particular application.

In some examples, strength of communication facility 480 may be configured to derive a personality profile of a user 230 based on the strength of communication data 465 acquired for that user 230. For example, the strength of communication facility 480 may be configured to analyze the acquired strength of communication data 465 and determine one or more personality traits of the user 230. To illustrate, based on strength of communication data 465 the strength of communication facility 480 may determine that the user 230 is either an introvert or extrovert (e.g., the user 230 is associated with a minimal number of communications or has a pattern of incoming communications outnumbering outgoing communications), that the user 230 prefers a particular mode of communication (e.g., SMS messages), that the user 230 prefers a particular mode of communication over another mode of communication (e.g., the user 230 has a pattern of SMS messages outnumbering phone calls), that the user 230 is a morning or night person (e.g., the number of outgoing communications is greatest within a particular time period), etc. The personality profile may be accessed by the user 230 and/or by one or more other users 230 as may serve a particular application.

Figure 12:
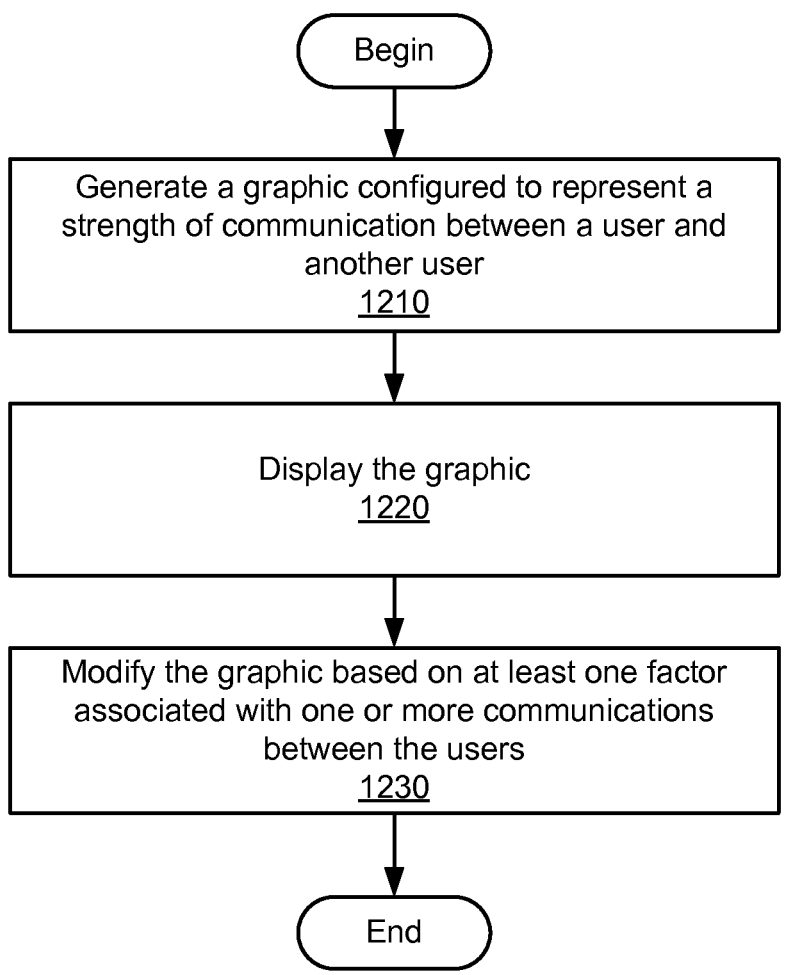
FIG. 12 illustrates an exemplary method of graphically conveying a strength of communication between users.

FIG. 12 illustrates an exemplary method of graphically conveying a strength of communication between users. While FIG. 12 illustrates exemplary steps according to one embodiment, other embodiments may omit, add to, reorder, and/or modify any of the steps shown in FIG. 12.

In step 1210, a graphic configured to represent a strength of communication between a user and another user is generated. The graphic may be generated in any of the ways described herein. For example, the graphic may be generated based on strength of communication data and in accordance with a predefined heuristic.

In step 1220, the graphic is displayed. The graphic may displayed in any of the ways described herein.

In step 1230, the graphic is modified based on at least one factor associated with one or more communications between the users. The at least one factor may include any of the factors described herein. The graphic may be modified in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

determining, by at least one physical server, a first strength of communication metric representative of a strength of communications initiated by a first user towards a second user during a time period and a second strength of communication metric representative of a strength of communications initiated by the second user towards the first user during the time period, wherein the determining of the first and second strength of communication metrics comprises determining the first and second strength of communication metrics based at least in part on communications initiated via a plurality of types of communication mediums;

generating, by the at least one physical server based on the determined first and second strength of communication metrics, a strength of communication graphic that graphically represents the strength of the communications initiated by the first user towards the second user relative to the strength of the communications initiated by the second user towards first user; and providing, by the at least one physical server, the graphic for display by an access device associated with the first user to:

facilitate visualization by the first user of the strength of the communications initiated by the first user towards the second user relative to the strength of the communications initiated by the second user towards the first user; and enable the first user to adjust a communication behavior relative to the second user based at least in part on the strength of the communications initiated by the first user towards the second user relative to the strength of the communications initiated by the second user towards the first user.

2. The method of claim 1, wherein the generating is performed in accordance with a predefined heuristic.

3. The method of claim 1, further comprising generating a personality profile for the first user based on the first strength of communication metric.

4. The method of claim 1, wherein the graphic comprises at least one arrow configured to represent at least one of:

the strength of the communications initiated by the first user towards the second user; and the strength of the communications initiated by the second user towards the first user.

5. The method of claim 4, wherein the at least one arrow comprises:

a first arrow configured to represent the strength of the communications initiated by the first user towards the second user; and a second arrow configured to represent the strength of the communications initiated by the second user towards the first user.

6. The method of claim 4, wherein the at least one arrow comprises an arrow having first and second heads, wherein the first head graphically represents the strength of the communications initiated by the first user towards the second user and the second head graphically represents the strength of the communications initiated by the second user towards the first user.

7. The method of claim 1, wherein the determining of the first strength of communication metric is further based on at least one factor associated with the communications initiated by the first user towards the second user during the time period, wherein the at least one factor comprises at least one of an amount, a frequency, a type, a relative quality, a source, and a duration of the communications initiated by the first user towards the second user during the time period.

8. The method of claim 7, further comprising weighting at least one of the at least one factor and modifying the strength of communication graphic based on the weighted at least one of the at least one factor.

9. The method of claim 1, tangibly embodied as computer-executable instructions on at least one non-transitory computer-readable medium.

10. The method of claim 1, further comprising:
detecting, by the at least one physical server, a change in at least one factor associated with the communications between the first user and the second user;
modifying, by the at least one physical server, the graphic based on the change in the at least one factor; and
providing, by the at least one physical server, the modified graphic for display by the access device associated with the first user.

11. The method of claim 1, further comprising:
monitoring, by the at least one physical server, one or more communications between the first and second users that occur after the time period;
modifying, by the at least one physical server, at least one of the first and second strength of communication metrics based on the monitored one or more communications between the first and second users that occur after the time period; and
modifying, by the at least one physical server, the strength of communication graphic based on the modified at least one of the first and second strength of communication metrics.

12. The method of claim 1, wherein the determining of the second strength of communication metric is further based on at least one factor associated with the communications initiated by the second user towards the first user during the time period, wherein the at least one factor comprises at least one of an amount, a frequency, a type, a relative quality, a source, and a duration of the communications initiated by the second user towards the first user during the time period.

13. A system comprising:
at least one physical server that comprises
a strength of communication facility that
determines a first strength of communication metric representative of a strength of communications initiated by a first user towards a second user during a time period and a second strength of communication metric representative of a strength of communications initiated by the second user towards the first user during the time period, wherein the determining of the first and second strength of communication metrics comprises determining the first and second strength of communication metrics based at least in part on communications initiated via a plurality of types of communication mediums,
generates, based on the determined first and second strength of communication metrics, a strength of communication graphic configured to graphically represent the strength of the communications initiated by the first user towards the second user relative to the strength of communications initiated by the second user towards the first user, and
provides the graphic for display by an access device associated with the first user to
facilitate visualization by the first user of the strength of the communications initiated by the first user towards the second user relative to the strength of the communications initiated by the second user towards the first user, and
enable the first user to adjust a communication behavior relative to the second user based at least in part on the strength of the communications initiated by the first user towards the second user relative to the strength of the communications initiated by the second user towards the first user.

14. The system of claim 13, wherein the strength of communication facility is further configured to generate the graphic in accordance with a predefined heuristic.

15. The system of claim 13, wherein the graphic comprises at least one arrow configured to represent at least one of:
the strength of the communications initiated by the first user towards the second user; and
the strength of the communications initiated by the second user towards the first user.

16. The system of claim 15, wherein the at least one arrow comprises:
a first arrow configured to represent the strength of the communications initiated by the first user towards the second user; and
a second arrow configured to represent the strength of the communications initiated by the second user towards the first user.

17. The system of claim 15, wherein the at least one arrow comprises an arrow having first and second heads, and wherein the strength of communication facility further modifies the graphic by:
adjusting at least one attribute of the first head to convey a change in the strength of the communications initiated by the first user towards the second user; and
adjusting at least one attribute of the second head to convey a change in the strength of the communications initiated by the second user towards the first user.

18. The system of claim 13, wherein the strength of communication facility determines the first strength of communication metric based on at least one factor associated with the communications initiated by the first user towards the second user during the time period, wherein the at least one factor comprises at least one of an amount, a frequency, a type, a relative quality, a source, and a duration of the communications initiated by the first user towards the second user during the time period.

19. The system of claim 13, wherein the graphic comprises a first object configured to represent the first user and a second object configured to represent the second user, and wherein the strength of communication facility further modifies the graphic by adjusting at least one attribute of at least one of the first and second objects to convey a change in the strength of the communications initiated by the first user towards the second user relative to the strength of the communications initiated by the second user towards the first user.

20. An apparatus comprising:
a physical processor that:
- determines a first strength of communication metric representative of a strength of communications initiated by a first user towards a second user during a time period and a second strength of communication metric representative of a strength of communications initiated by the second user towards the first user during the time period, wherein the determining of the first and second strength of communication metrics comprises determining the first and second strength of communication metrics based at least in part on communications initiated via a plurality of types of communication mediums, and
- generates, based on the determined first and second strength of communication metrics, a graphic configured to represent the strength of the communications initiated by the first user towards the second user relative to a strength of the communications initiated by the second user towards the first user; and a physical display communicatively coupled to the processor and configured to display the graphic;

wherein the physical processor further provides the graphic for display by the physical display to:
- facilitate visualization by the first user of the strength of the communications initiated by the first user towards the second user relative to the strength of the communications initiated by the second user towards the first user, and
- enable the first user to adjust a communication behavior relative to the second user based at least in part on the strength of the communications initiated by the first user towards the second user relative to the strength of the communications initiated by the second user towards the first user.

* * * * *